United States Patent
Huang et al.

(10) Patent No.: US 9,942,843 B2
(45) Date of Patent: Apr. 10, 2018

(54) DETERMINING A NETWORK ALLOCATION VECTOR SETTING AND A RESPONSE TO A MULTI-USER TRANSMISSION OPPORTUNITY

(71) Applicant: Intel IP Corporation, Santa Clara, CA (US)

(72) Inventors: Po-Kai Huang, West Lafayette, IN (US); Robert J. Stacey, Portland, OR (US); Chittabrata Ghosh, Fremont, CA (US); Laurent Cariou, Portland, OR (US); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 70 days.

(21) Appl. No.: 14/973,577

(22) Filed: Dec. 17, 2015

(65) Prior Publication Data
US 2017/0006542 A1 Jan. 5, 2017

Related U.S. Application Data

(60) Provisional application No. 62/187,569, filed on Jul. 1, 2015.

(51) Int. Cl.
H04W 4/00 (2009.01)
H04W 52/02 (2009.01)
(Continued)

(52) U.S. Cl.
CPC ...... H04W 52/0209 (2013.01); H04B 7/0452 (2013.01); H04L 5/0023 (2013.01); H04W 48/20 (2013.01); H04W 74/006 (2013.01); H04L 5/0055 (2013.01); H04W 74/02 (2013.01); Y02B 80/50 (2013.01)

(58) Field of Classification Search
USPC ................................ 370/329, 311, 312, 392
See application file for complete search history.

(56) References Cited

U.S. PATENT DOCUMENTS 8,526,346 B1 * 9/2013 Liu .................. H04W 52/0229
370/311
2008/0112351 A1 * 5/2008 Surineni .......... H04W 74/0816
370/312

(Continued)

OTHER PUBLICATIONS

"U.S. Appl. No. 14/973,528, Non Final Office Action dated Sep. 26, 2017", 10 pgs.

Primary Examiner — Phuongchau Ba Nguyen
(74) Attorney, Agent, or Firm — Schwegman Lundberg & Woessner, P.A.

(57) ABSTRACT

An apparatus comprising: a memory and processing circuitry coupled to the memory, where the processing circuitry is configured to: associate with a master station, decode a trigger frame or a multi-user request-to-send (MU-RTS) frame from the master station, where the trigger frame or the MU-RTS frame comprises a first duration and a transmitter address, and respond to the trigger frame or the MU-RTS frame if a network allocation vector (NAV) is not set, or if the NAV is set and a saved transmission opportunity (TXOP) holder address for the NAV is the same as the transmitter address of the MU-RTS or trigger frame and the trigger frame or MU-RTS indicates the station is to respond.

23 Claims, 13 Drawing Sheets

(51) Int. Cl.
  *H04W 48/20*   (2009.01)
  *H04W 74/00*   (2009.01)
  *H04B 7/0452*  (2017.01)
  *H04L 5/00*        (2006.01)
  *H04W 74/02*       (2009.01)

(56) References Cited

U.S. PATENT DOCUMENTS

| | | | |
|---|---|---|---|
| 2009/0138603 A1* | 5/2009 | Surineni | H04W 76/023 |
| | | | 709/227 |
| 2010/0165907 A1 | 7/2010 | Chu et al. | |
| 2011/0069628 A1 | 3/2011 | Liu et al. | |
| 2011/0080977 A1 | 4/2011 | Liu et al. | |
| 2011/0317630 A1* | 12/2011 | Zhu | H04W 74/0816 |
| | | | 370/329 |
| 2016/0249397 A1* | 8/2016 | Seok | H04W 76/023 |
| 2017/0006541 A1 | 1/2017 | Huang et al. | |
| 2017/0006542 A1* | 1/2017 | Huang | H04W 52/0209 |
| 2017/0006635 A1* | 1/2017 | Huang | H04W 74/0816 |

\* cited by examiner

US 9,942,843 B2

DETERMINING A NETWORK ALLOCATION VECTOR SETTING AND A RESPONSE TO A MULTI-USER TRANSMISSION OPPORTUNITY

PRIORITY CLAIM

This application claims the benefit of priority under 35 USC 119(e) to U.S. Provisional Patent Application Ser. No. 62/187,569, filed Jul. 1, 2015, which is incorporated herein by reference in their entirety.

TECHNICAL FIELD

Embodiments relate to wireless devices. Some embodiments relate to Institute of Electrical and Electronic Engineers (IEEE) 802.11. Some embodiments relate to IEEE 802.11ax. Some embodiments relate to setting network allocation vector (NAV) settings when a station is within more than one basic service set and/or NAV settings for transmission opportunities (TXOPs). Some embodiments relate to more than one NAV. Some embodiments relate a station determining when to respond to a trigger frame and request to send packet. Some embodiments relate to when and/or for how long to enter a power save mode.

BACKGROUND

Efficient use of the resources of a wireless local-area network (WLAN) is important to provide bandwidth and acceptable response times to the users of the WLAN. Moreover, wireless devices may need to operate with both newer protocols and with legacy device protocols, and may need to operate in range of more than one access point. Additionally, many wireless devices have limited battery power.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
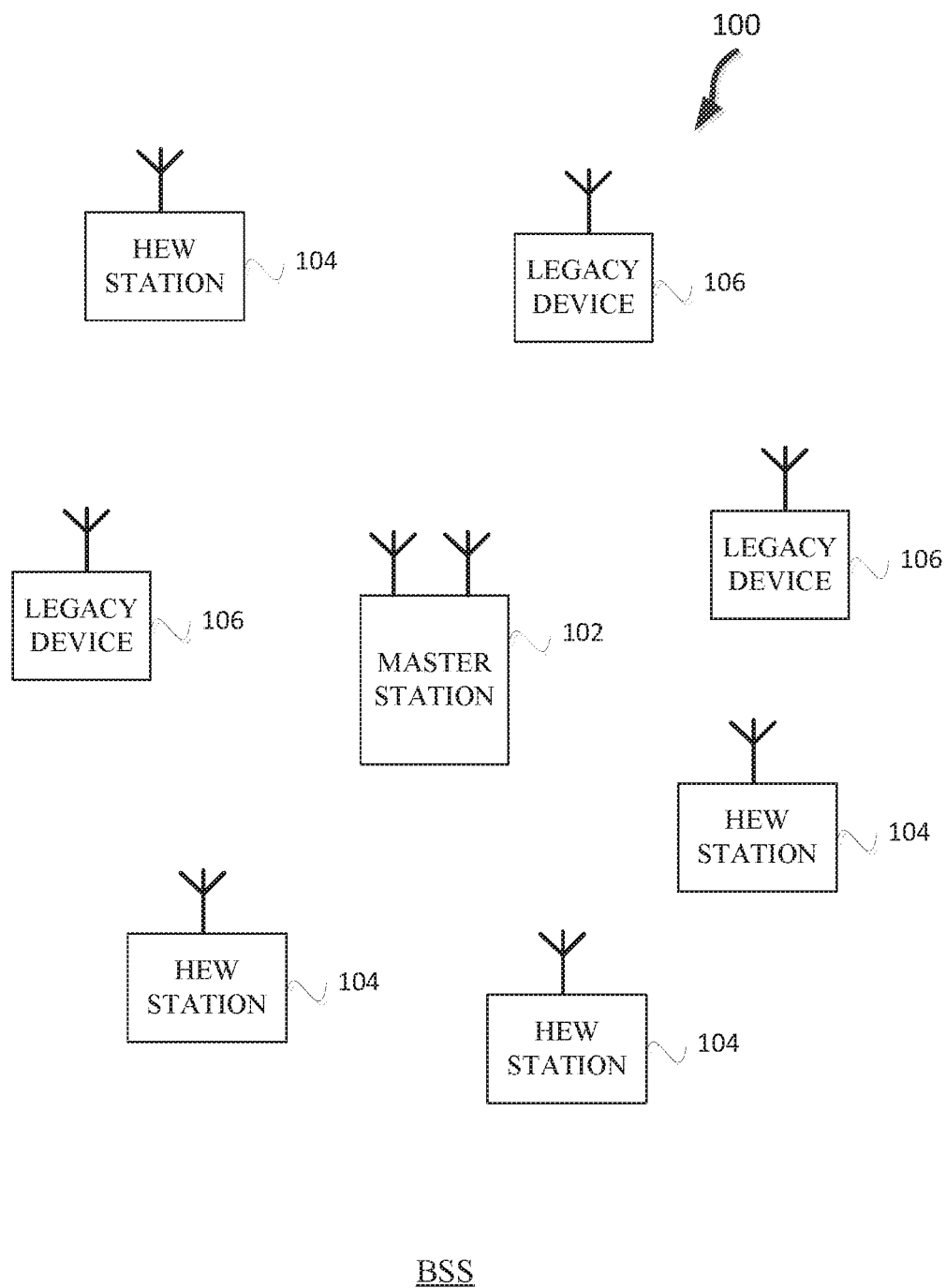
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-13.

Figure 2:
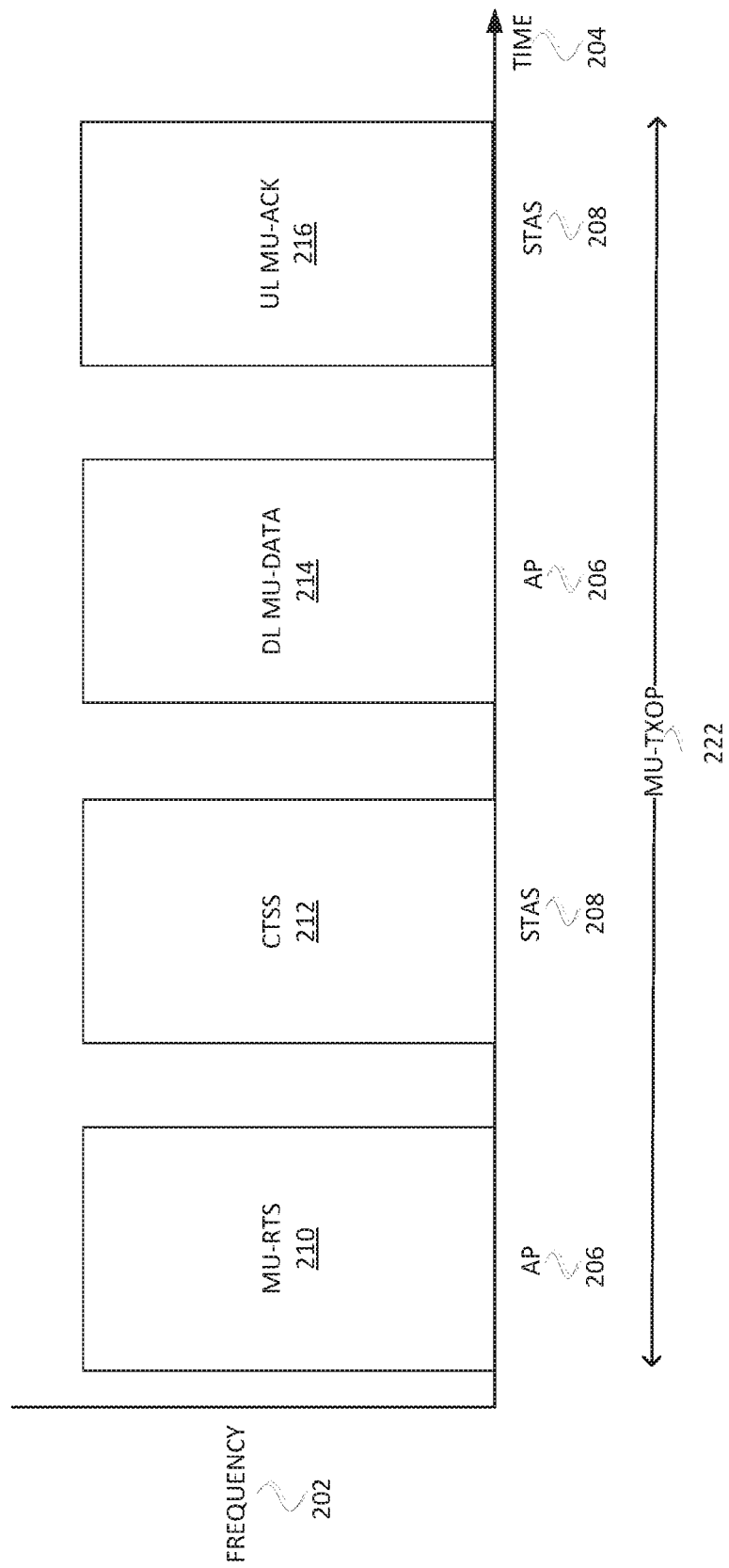
FIGS. 2-4 illustrate transmission opportunities (TXOP) in accordance with some embodiments.
Figure 3:
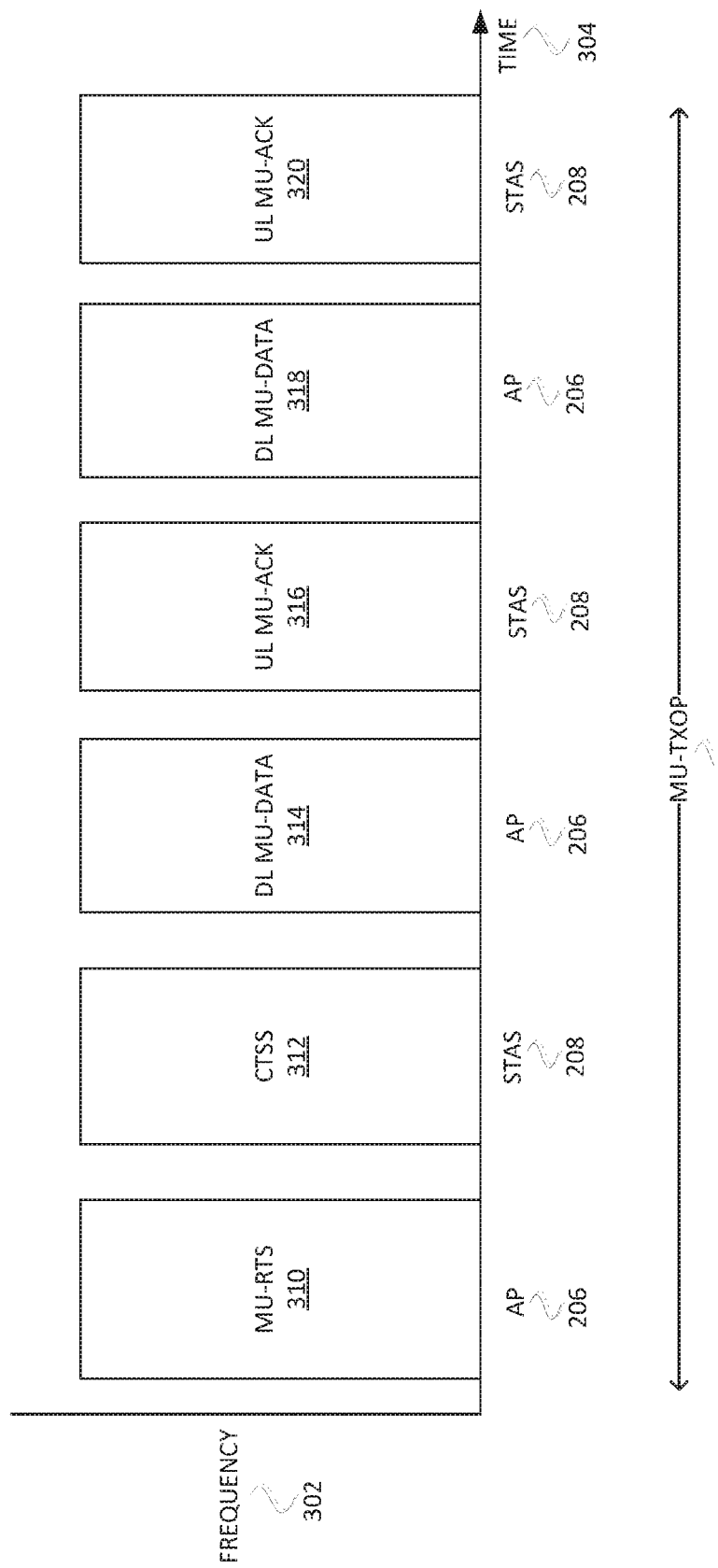
Figure 4:
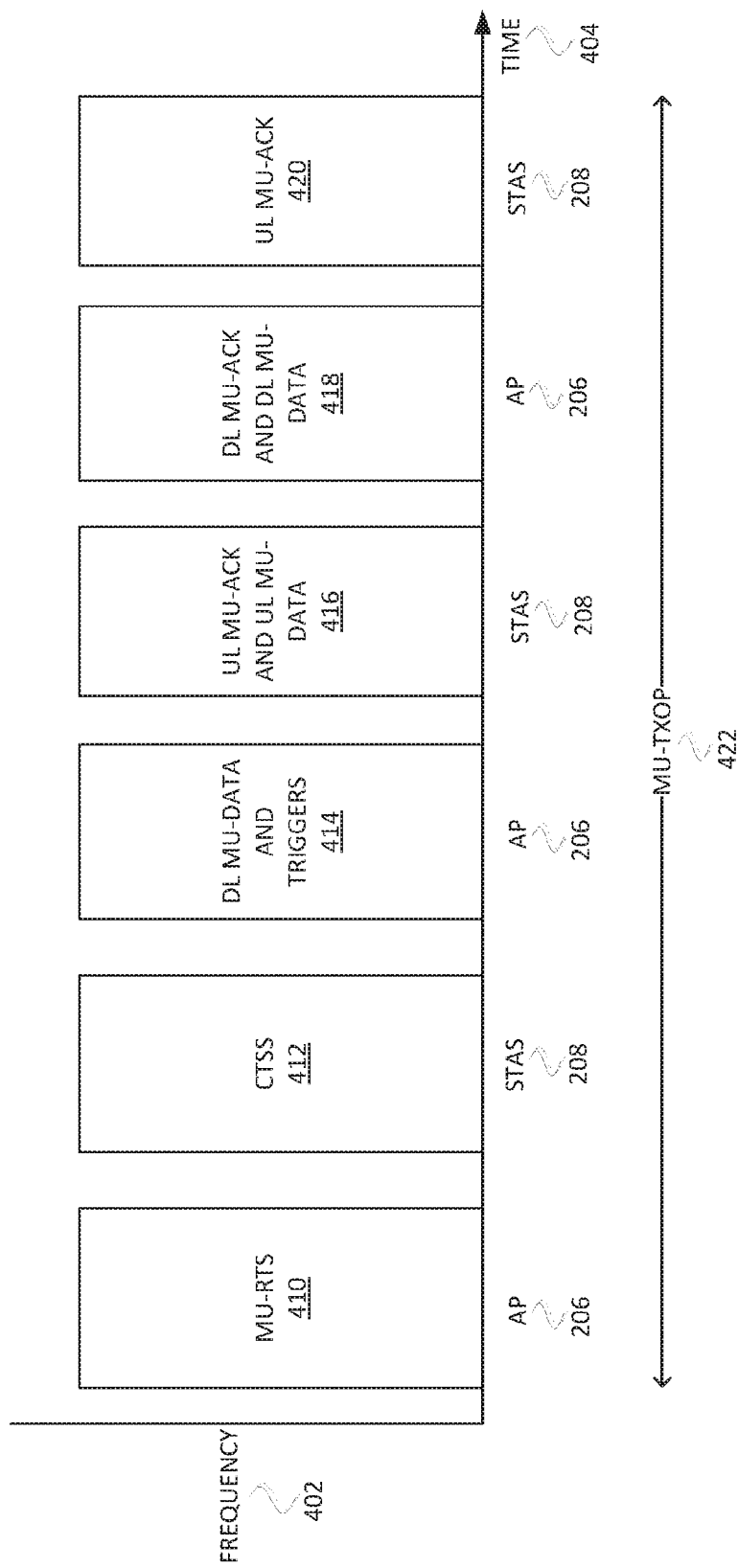

FIGS. 2-4 illustrate transmission opportunities (TXOP) 222, 322, 422, in accordance with some embodiments. Illustrated in FIGS. 2-5 is time 204, 304, 404, respectively, along a horizontal axis, frequency 202, 302, 402, respectively, along a vertical axis, and a transmitter (e.g., AP 206 or STAs 208) along the bottom.

FIG. 2 illustrates a transmission opportunity (TXOP) 222. The TXOP 222 may begin with a multi-user request to send (MU-RTS) 210 being transmitted by an AP 206. The AP 206 may be a master station 102. The STAs 208 may be HEW stations 104. The STAs 208 are associated with the AP 206. The MU-RTS 210 may initiate a MU-TXOP 222. A TXOP started by a MU-RTS 210 and CTSs 212 may be termed a MU-TXOP. Only the AP 206 should be able to contend for the wireless medium in a MU-TXOP. The MU-RTS 210 may include an indication of which STAs 208 are to transmit clear-to-sends (CTSs) 212 and an indication of whether a STA 408 is participating in the MU-TXOP 222 (e.g., see FIG. 11). The MU-RTS 210 and/or DL MU-DATA 214 may include information for a trigger frame such as resource allocations for one or more STAs 208 that includes a duration and one or more sub-channels.

The MU-TXOP 222 may continue with the STAs 208 transmitting CTSs 212. For example, some or all of the STAs 208 may transmit CTSs 312 in accordance with the MU-RTS 310 and network allocation vector (NAV) settings of the STAs 208. The MU-TXOP 222 continues with downlink multi-user data (DL MU-DATA) 214 being transmitted by the AP 206. The DL MU-DATA 214 includes data for one or more of the STAs 208. The DL MU-DATA 214 is transmitted in accordance with the trigger frame.

The MU-TXOP 222 continues with UL-MU-ACK 216 being transmitted by the STAs 208. The STAs 208 that received data in DL MU-DATA 214 transmit an acknowledgement or block acknowledgement to the AP 206 in the UL MU-ACK 216. The resources to use to transmit the UL MU-ACK 216 to the AP 206 may be indicated either explicitly or implicitly in the trigger frame. The MU-TXOP 222 may end.

FIG. 3 illustrates a TXOP 322. The TXOP 322 may begin with a MU-RTS 310 being transmitted by an AP 206. The MU-RTS 310 may initiate a TXOP 322. The MU-RTS 310 may include an indication of which STAs 208 are to transmit CTSs 312 and an indication of whether a STA 208 is participating in the MU-TXOP 222 (e.g., see FIG. 11). The MU-RTS 310 and/or DL MU-DATA 314 may include information for a trigger frame such as resource allocations for one or more STAs 208 that includes a duration and one or more sub-channels.

The MU-TXOP 322 may continue with the STAs 208 transmitting CTSs 312. For example, some or all of the STAs 208 may transmit CTSs 312 in accordance with the MU-RTS 310 and network allocation vector (NAV) settings of the STAs 208. The MU-TXOP 322 continues with DL MU-DATA 314 being transmitted by the AP 206. The DL MU-DATA 314 includes data for one or more of the STAs 208. The DL MU-DATA 314 is transmitted in accordance with the trigger frame.

The MU-TXOP 322 continues with UL-MU-ACK 316 being transmitted by the STAs 208. The STAs 208 that received data in DL MU-DATA 314 transmit an acknowledgement or block acknowledgement to the AP 206 in the UL MU-ACK 316. The resources to use to transmit the UL MU-ACK 316 to the AP 206 may be indicated either explicitly or implicitly in the trigger frame.

The MU-TXOP 322 may continue with DL MU-DATA 318 and UL MU-ACK 320 being transmitted by the AP 206 and STAs 208, respectively. The resources to transmit the DL MU-DATA 318 and UL MU-ACK 320 may have been indicated in the trigger frame. The MU-TXOP 322 may end.

FIG. 4 illustrates a TXOP 422. The TXOP 422 may begin with a MU-RTS 410 being transmitted by an AP 206. The MU-RTS 410 may initiate a TXOP 422. The MU-RTS 410 may include an indication of which STAs 208 are to transmit CTSs 412 and an indication of whether a STA 208 is participating in the MU-TXOP 422 (e.g., see FIG. 11). The MU-RTS 410 and/or DL MU-DATA 414 may include information for a trigger frame such as resource allocations for one or more STAs 208 that includes a duration and one or more sub-channels.

The MU-TXOP 422 may continue with the STAs 208 transmitting CTSs 412. For example, some or all of the STAs 208 may transmit CTSs 412 in accordance with the MU-RTS 410 and network allocation vector (NAV) settings of the STAs 208. The MU-TXOP 422 continues with DL MU-DATA and triggers 414 being transmitted by the AP 206. The DL MU-DATA and triggers 414 includes data for one or more of the STAs 208 and one or more trigger frames that indicate one or more STAs 208 may transmit data to the AP 206. The DL MU-DATA and triggers 414 is transmitted in accordance with the trigger frame. The uplink (UL) MU-ACK and UL MU-DATA 416 is transmitted by the STAs 208. The UL MU-DATA is transmitted in accordance with the triggers in the DL MU-DATA and triggers 414. The MU-TXOP 422 continues with DL MU-ACK and DL MU-DATA 418. The DL MU-ACK may be in response to the UL MU-DATA 416 and the DL MU-DATA may be additional DL of data. The resource allocations for the DL MU-DATA may be included in the trigger frame or a subsequent frame such as the DL MU-ACK and DL MU-DATA 418. The UL MU-ACK 420 may be transmitted by the STAs 208 in response to the DL MU-DATA of the DL MU-ACK and DL MU-DATA 418. The MU-TXOP 422 may end.

In some embodiments additional frames may be download and/or uploaded in accordance with trigger frames that may be sent independently or in conjunction with other frames. Moreover, the trigger frames may indicate a duration that includes multiple data transmissions by the AP 206 in one TXOP. Additionally, frames may include trigger frames for one or more STAs in addition to data.

Figure 5:
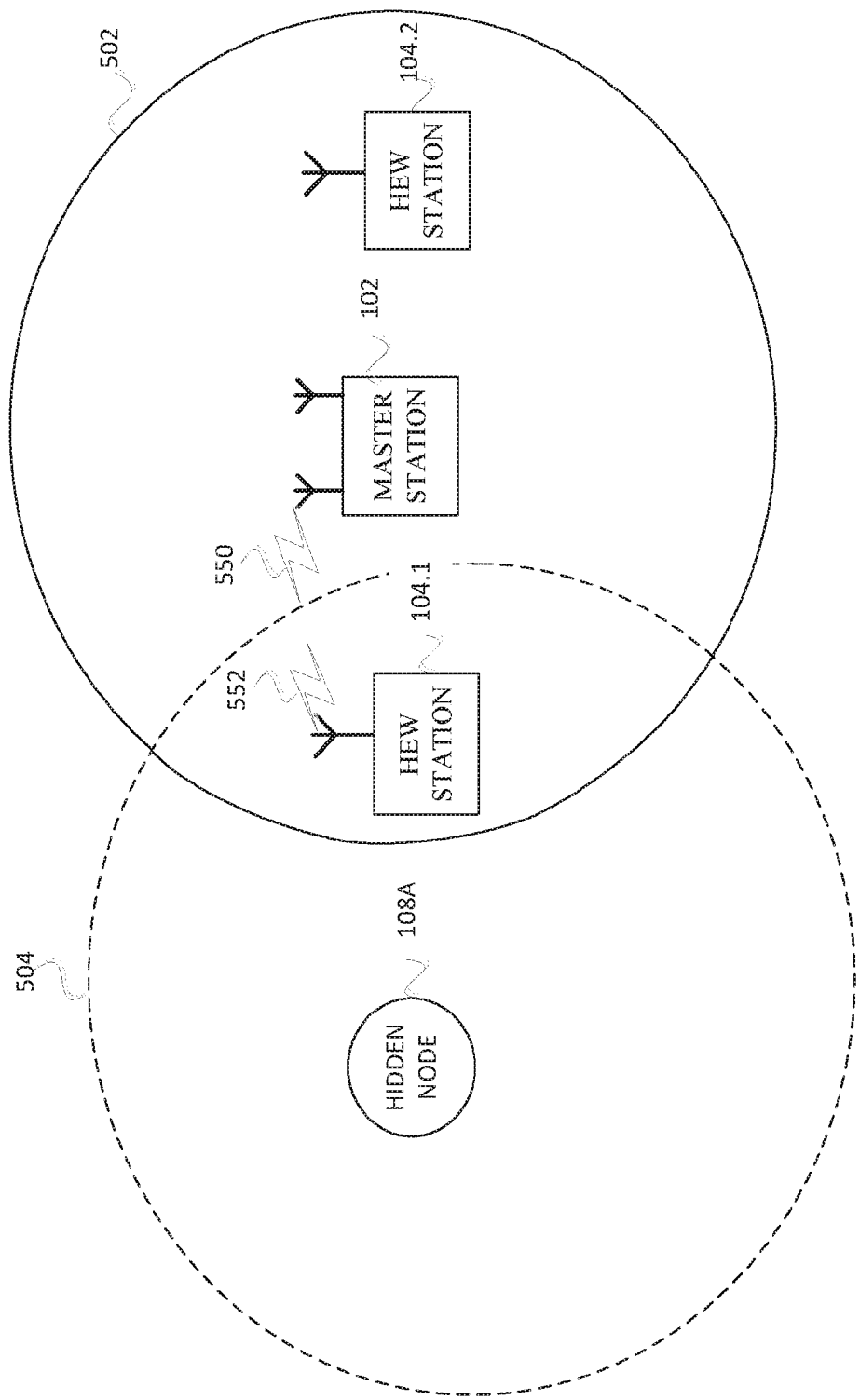
FIG. 5 illustrates the hidden node problem in accordance with example embodiments.

FIG. 5 illustrates the hidden node problem in accordance with example embodiments. Illustrated in FIG. 5 are the transmission range 502 of a basic service set (BSS), the transmission range 504 of an overlapping BSS (OBSS), master station 102, HEW stations 104, transmission 550, and transmission 552.

The master station 102 may be sending transmission 550 to HEW device 104.1. The master station 102 transmission range 502 does not include hidden node 108C. Hidden node 108C will then not receive transmission 550 and will not defer transmitting. For example, hidden node 108C would not receive the MU-RTS 210 of FIG. 2. Hidden node 108C may then transmit at the same time that master station 102 is transmitting, which may interfere with the reception of the transmission 550 to HEW station 104.1. The MU-RTS/CTSs are intended to set the NAV of the hidden nodes 108C so as not to interfere with the MU-TXOPs.

In example embodiments, the master station 102 and HEW stations 104 may be configured to use MU-RTS/CTS in an OFDMA or MU-MIMO downlink transmission so that the hidden node 108 will defer transmitting during the OFDMA and/or MU-MIMO MU-TXOP. In example embodiments, the master station 102 and/or HEW devices 104 may set a physical (PHY) length field or a media access control (MAC) length field to defer the hidden nodes 108.

Additionally, HEW station 104.1 is transmitting transmission 552 to master station 102 at a different time than when master station 102 is transmitting transmission 550. HEW station 104.2 may contend for the wireless medium when HEW station 104.1 is transmitting transmission 552 unless a NAV of HEW station 104.2 is set. HEW station 104.2 may then be a hidden node with respect to HEW station 104.1 during transmission 552.

Figure 6:
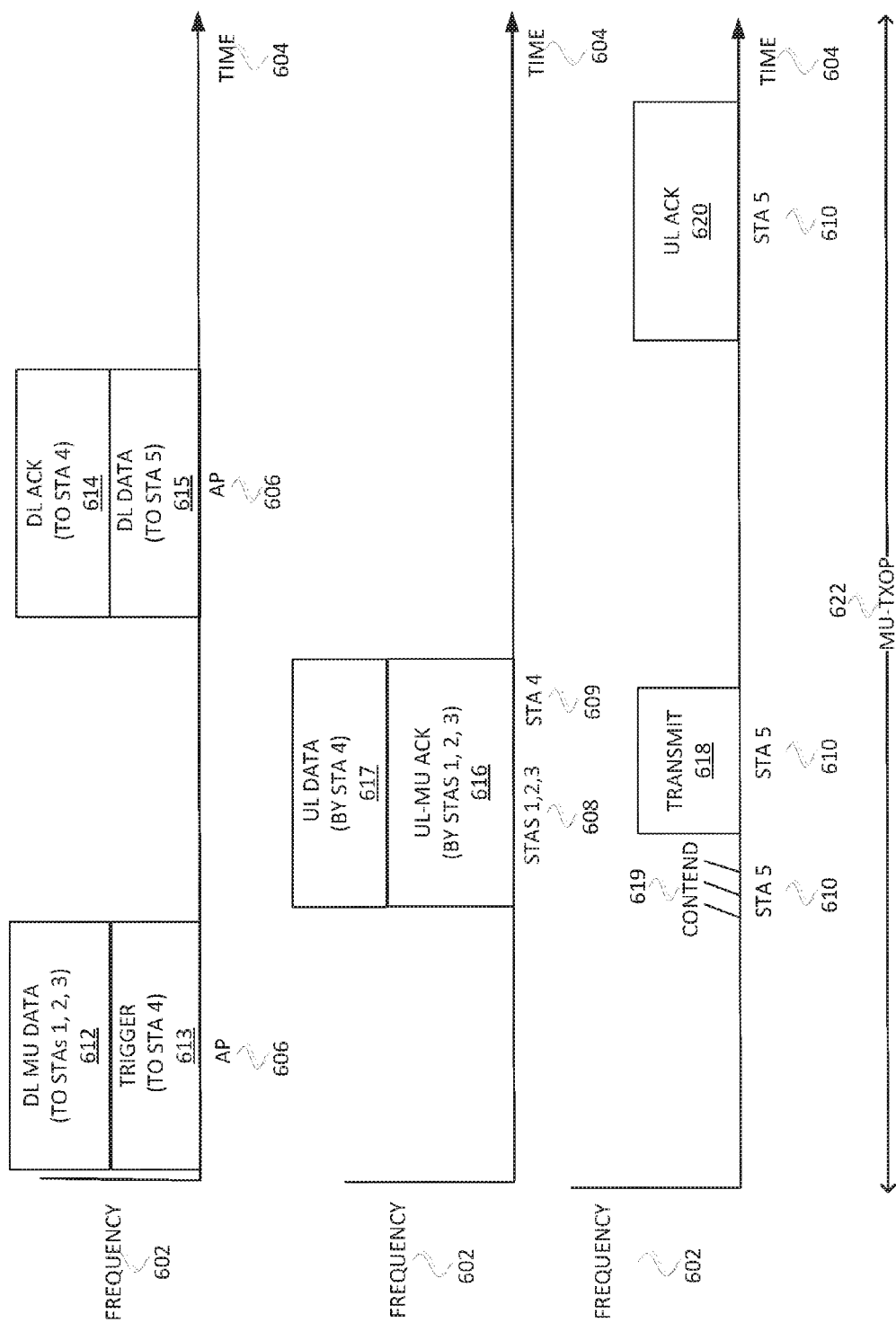
FIG. 6 illustrates a MU-TXOP in accordance with some embodiments.

FIG. 6 illustrates a MU-TXOP 622 in accordance with some embodiments. Illustrates in FIG. 6 is frequency 602 along a vertical axis and time 604 along a horizontal axis 604. The MU-TXOP 606 may have started with a MU-RTS or trigger frame (not illustrated.) The MU-TXOP 622 continues with a DL MU data 612 and trigger 613 transmitted by the AP 606. The DL MU data 612 includes data to STAs 1, 2, 3 608. The trigger 613 includes a trigger frame to STA 4 609. The MU-TXOP 622 continues with an UL DATA 617 by STA 4 609 and UL-MU ACK by STAs 1, 2, 3 608. STAs 1, 2, 3 608 transmit an UL-MU ACK to acknowledge the DL MU data 612 from the AP 606. STA 4, in accordance with the trigger in 613, transmits UL data 617 to the AP 606.

If STA 5 did not set a NAV during an initial trigger frame transmission or an MU-RTS, then STA 5 610 may contend 619 for wireless medium. The technical problem may be that when STAs 1, 2, 3 608 and/or STA 4 609 transmit that STA 5 610 may be hidden to STAs 1, 2, 3 608 and/or STA 4 and not set a NAV. For example, STA 5 610 may be HEW station 104.2 and STA 4 609 may be HEW station 104.1. The contend 619 by STA 5 610 is then successful since STA 5 610 does not receive the transmission UL data 617 and UL-MU ACK 616.

The MU-TXOP 622 continues with DL ACK 614 to STA 4 and DL data 615 to STA 5 being transmitted by the AP 606. The DL ACK 614 may be in response to the UL data 617. The DL data 615 to STA 5 may be in response to the transmit 618 which may include a request for data. The MU-TXOP 622 continues with UL ACK 620 by STA 5 610 in response to the DL data 615. The MU-TXOP 622 may end.

Figure 7:
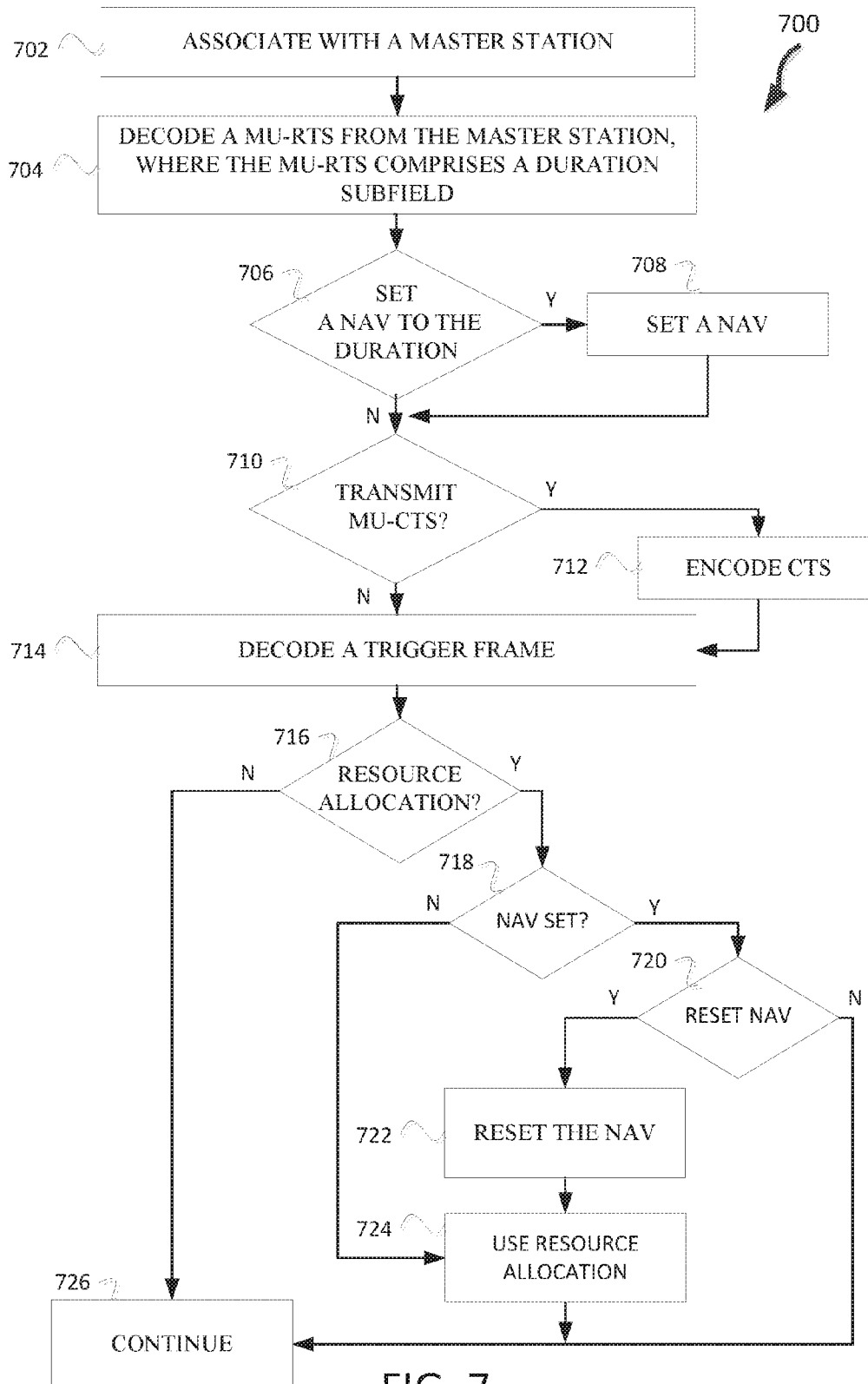
FIG. 7 illustrates a method for determining a NAV setting and a response to a MU-TXOP in accordance with some embodiments.

FIG. 7 illustrates a method 700 for determining a NAV setting and a response to a MU-TXOP in accordance with some embodiments. The method 700 begins at operation 702 with associating with a master station. For example a HEW station 104 may associate with the master station 102. The master station 102 may generate an association identification (AID) for the HEW station 102. Once the master station 102 and HEW station 104 are associated the master station 102 and/or HEW station 104 may perform services for one another. For example, the master station 102 may buffer data from outside sources (e.g., the Internet) for the HEW station 104 and then transmit the data to the HEW station 104. As another example, the master station 102 may receive data from the HEW station 104 and forward the data to another device.

The method 700 continues at operation 704 with decoding a MU-RTS from the master station where the MU-RTS comprises a duration. For example, a HEW station 104 may receive a MU-RTS frame and decode the MU-RTS frame. The MU-RTS frame includes a duration which is a time for the station performing the method to set their NAV so that the station does not contend for the wireless medium. For example, duration 1112 (FIG. 11), which may be two octets of data to indicate a duration.

The MU-RTS includes a receiver address (RA). In some embodiments, the master station 102 is configured to set the RA as a broadcast address. The broadcast address does not match the address of any stations (e.g., HEW stations 104) attached to the master station 102.

The method 700 continues at operation 706 with determining whether to set a NAV to the duration in the MU-RTS. The stations (e.g., HEW stations 104) are configured to set their NAV if the RA address does not match an address of the station, in accordance with some embodiments. For example, a HEW station 104 may set a NAV of the HEW station 104 to the duration of the RTS.

Figure 9:
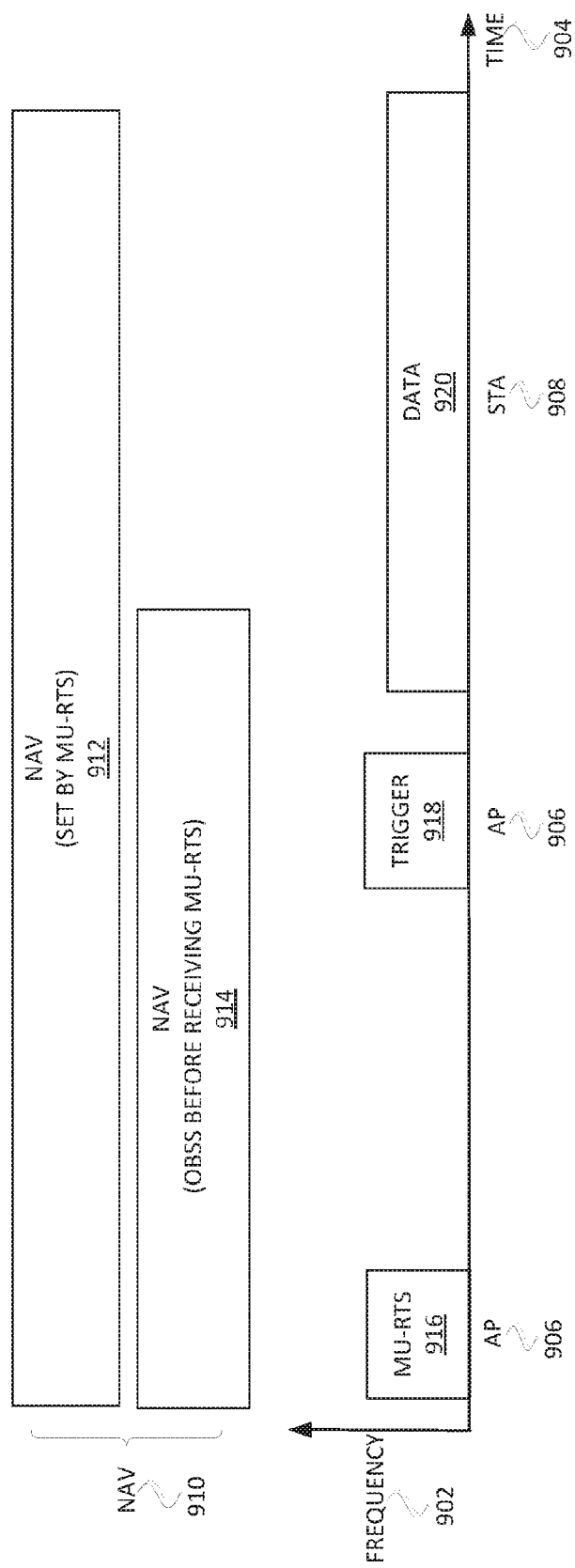
FIG. 9 illustrates a method of setting a NAV in response to a MU-RTS in accordance with some embodiments.

In some embodiments, the HEW station 104 has an OBSS NAV and an intra BSS (IBSS) NAV (see FIG. 9). In some embodiments, the HEW stations 104 will set the IBSS NAV based on the duration of the MU-RTS.

Figure 11:
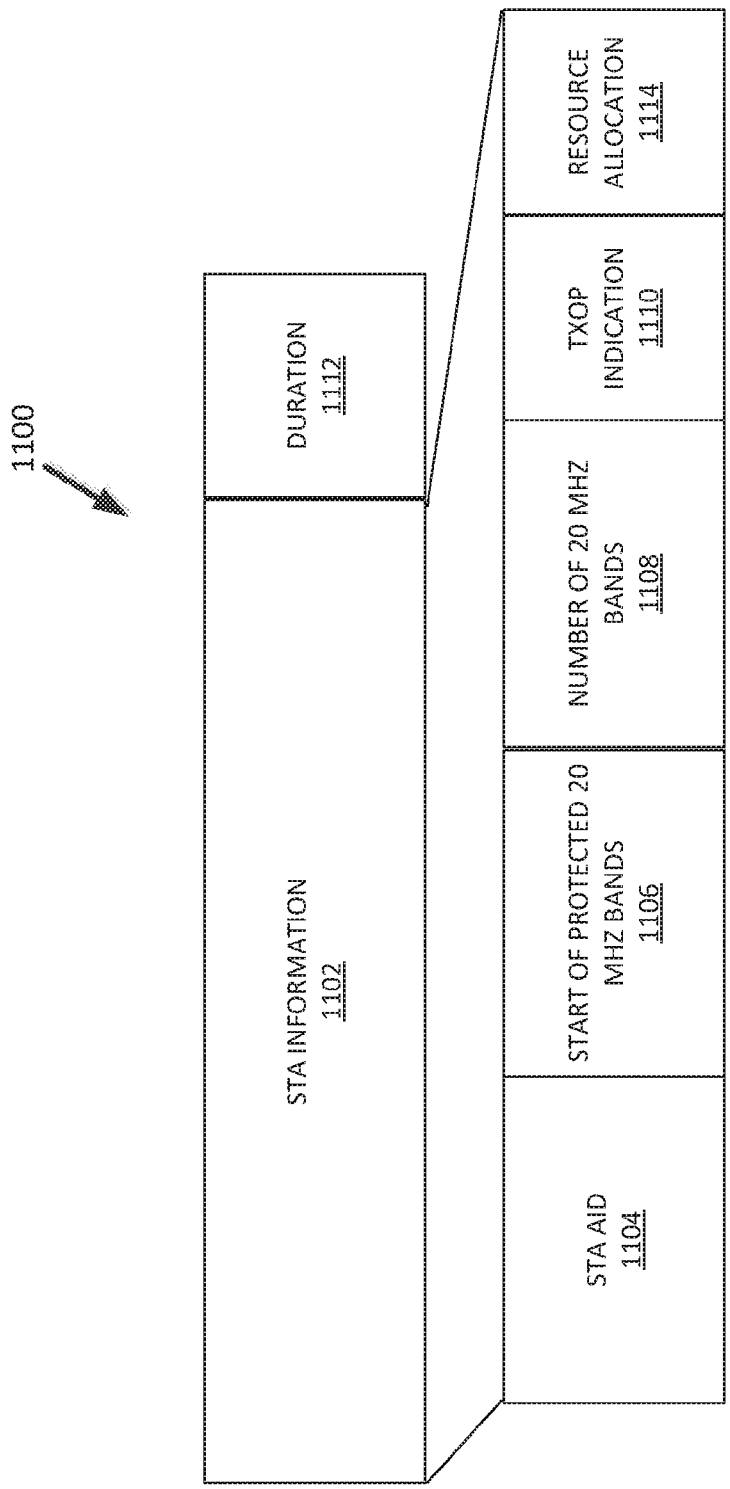
FIG. 11 illustrates a portion of MU-RTS frame in accordance with some embodiments.

In some embodiments, the MU-RTS frame includes one or more addresses of HEW stations (e.g., FIG. 11). The HEW stations 104 may be configured to not set their NAV based on the MU-RTS if their address is indicated in the MU-RTS frame. In some embodiments, the HEW station 104 may determine not to set the NAV based on the MU-RTS frame if the NAV of the HEW station 104 is already set and the duration of the NAV extends beyond the duration indicated in the MU-RTS and the NAV of the HEW station 104 was not set by the same master station 102 that transmitted the MU-RTS.

In some embodiments, if the HEW station 104 receives the MU-RTS and the address of the HEW station 104 is not indicated by the MU-RTS, then the HEW station 104 determines to set its NAV to the duration. In some embodiments, if the address of the HEW station 104 is not indicated in the MU-RTS and the NAV is already set of the HEW station 104, then the HEW station will set the NAV to the MU-RTS if it extends beyond the current NAV setting. In some embodiments, if the address of the HEW station 104 is not indicated in the MU-RTS and the NAV is already set of the HEW station 104, then the HEW station 104 will set the NAV to the MU-RTS duration if the NAV of the HEW station 104 was set by the same master station 102 (or by a master station 102 in the same BSS 100) that transmitted the MU-RTS frame.

In some embodiments, the MU-RTS indicates whether the station will participate in the TXOP to follow. The station may determine not to set the NAV because the station will participate in the TXOP (in accordance with a subsequent trigger frame.) In some embodiments, a station will set the NAV if the station is not to participate in the TXOP. The station may still transmit a MU-CTS. In some embodiments, the station will go into a sleep mode for the duration of the TXOP indicated by the duration in the MU-RTS.

If the station determines to set its NAV based on the MU-RTS, then the method 700 continues at operation 708 with setting a NAV. For example, if a HEW station 104 determines to set its NAV in operation 706, then the HEW station 104 may set its NAV to the duration indicated in the MU-RTS frame.

In some embodiments, the MU-RTS may indicate the address of the HEW station 102 to transmit a MU-CTS, and indicate that the HEW station 104 should set its NAV.

The method 700 continues at operation 710 with encoding a MU-CTS. For example, the HEW station 104 may encode a MU-CTS with a duration set to a duration based on the duration of the MU-RTS. The HEW station 104 may then transmit the MU-CTS.

The method 700 continues at operation 710 with determining whether to transmit a MU-CTS. In some embodiments, a HEW station 104 will not respond to the MU-RTS if the NAV of the HEW station 104 was set prior to the receipt of the MU-RTS. In some embodiments, the MU-RTS includes an indication of the address of HEW stations 104 (e.g., FIG. 11). The HEW station 104 may determine to transmit a MU-CTS if the address of the HEW station 104 is indicated in the MU-RTS.

In some embodiments, when HEW stations 104 determine whether to respond to a trigger frame or MU-RTS, the HEW stations 104 will not consider the IBSS NAV, but only the OBSS NAV. The HEW station 104 may determine not to transmit a MU-CTS if the OBSS NAV is set.

The method 700 continues at operation 714 with decoding a trigger frame. For example, the HEW station 104 may receive a trigger frame. The trigger frame may be part of the MU-RTS. The trigger frame may be part of another transmission.

The method 700 continues at operation 716 with is there a resource allocation for the station. The trigger frame may indicate an uplink (UL), downlink (DL), or trigger frame resource for the station. If there are no resource allocations for the station, then the method continues at operation 726 with continue. In some embodiments, if the station is not indicated in the trigger frame and not indicated (or polled) in the MU-RTS, then the station will set the NAV in accordance with the MU-RTS and/or trigger frame to defer until the TXOP indicated by the trigger frame is over.

If there is a resource allocation for the station, then the method 700 continues at operation 718 with NAV set. If the NAV is not set, then the method 700 continues at operation 724 where the station may use resource allocation. For example, the HEW station 104 may transmit data to the master station 102 or receive data from the master station 102 in accordance with the trigger frame. In some embodiments, the HEW stations 104 will determine whether the OBSS NAV is set.

If the NAV is set at operation 718, then the method 700 continues at operation 720 with reset NAV. For example, the HEW station 104 may determine to reset the NAV if the MAC address of the master station 102 that transmitted the trigger frame is the same as the MAC address of the master station 102 that transmitted the frame that set the NAV (e.g., the MU-RTS). In some embodiments, the HEW station 104 may determine to reset the NAV if the MAC address of the master station 102 that transmitted the trigger frame is the same as the MAC address of the master station 102 that transmitted the frame that set the NAV (e.g., the MU-RTS) and the resource allocation is an UL resource allocation. In some embodiments, the HEW stations 104 will not reset a OBSS but may reset the IBSS.

Some embodiments solve the technical problem that a MU-RTS may set a NAV and prevent the station from using the resource allocation indicated in the trigger frame.

In some embodiments, the station may determine to reset the NAV if the NAV was set by a MU-RTS and if they do not receive any MU-CTS and do not observe data from the master station 102 that sent the MU-RTS for a predetermined time after receiving the MU-RTS. In some embodiments, the station will determine to reset the NAV if the same master station 102 that sent the MU-RTS sent the trigger frame.

In some embodiments, the station may determine to reset the NAV based on a size of a UL transmission indicated in the trigger frame. For example, if the UL transmission is above a predetermined threshold, the station may reset the NAV. In some embodiments, the station may determine to reset the NAV based on whether an ACK is included in the uplink transmission or not. For example, if an ACK is included in the UL transmission, the station may determine to reset the NAV.

The method 700 continues at operation 726 if the station determines not to reset the NAV. The method 700 continues at operation 722 with reset the NAV if the station determines to reset the NAV. For example, HEW station 104 may reset the NAV. The method 700 continues at operation 724 with using resource allocation.

Figure 8:
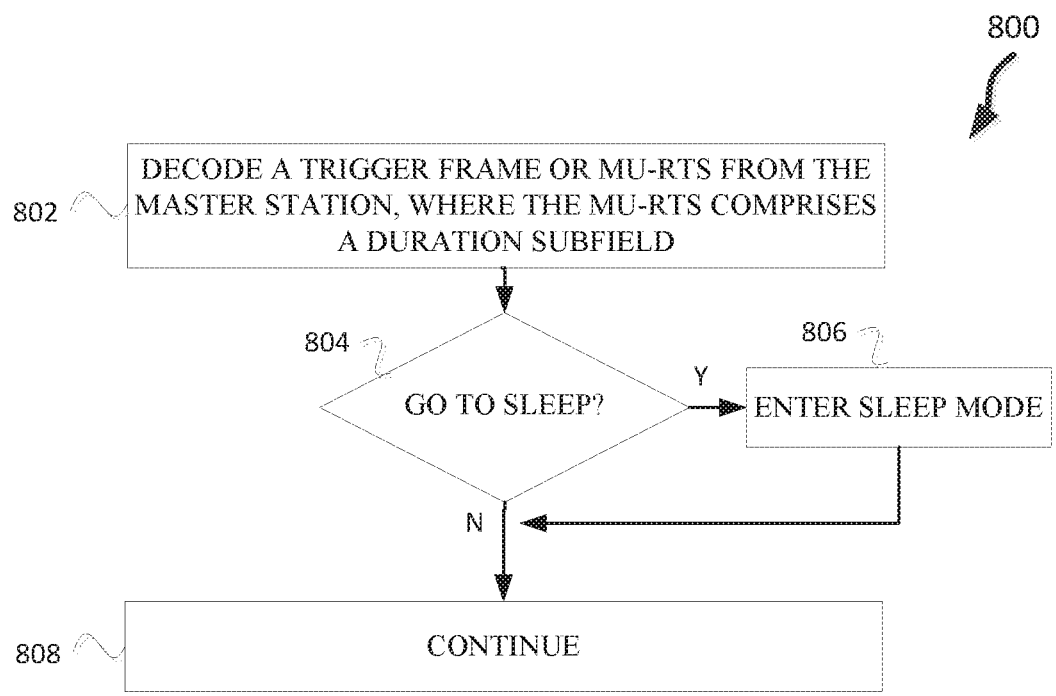
FIG. 8 illustrates a method for sleeping in accordance with some embodiments.

FIG. 8 illustrates a method 800 for sleeping in accordance with some embodiments. The method 800 begins at operation 802 with a HEW station 104 decoding a trigger frame or MU-RTS from the master station where the trigger frame or MU-RTS comprises a duration. The method 800 continues at operation 804 with determining whether to go to sleep. The HEW station 104 may decode the trigger frame or MU-RTS and determine whether or not the HEW station 104 is to participate in a TXOP. If the HEW station 104 is not to participate in the TXOP, then the HEW station 104 may determine to go to sleep. In some embodiments, the HEW station 104 may transmit a clear-to-send in response to the MU-RTS and then enter the sleep mode. In some embodiments, the MU-RTS may give a time for when the HEW station 104 is to receive a resource allocation in the TXOP. The HEW station 104 may determine whether to go to sleep based on whether the time before the resource allocation happens is above a predetermined threshold.

If the HEW station 104 determines not to go to sleep, the method 800 may continue at operation 808 with continuing. The HEW station 104 may continue to perform operations in a non-sleep mode. If the HEW station 104 determines to go to sleep, then the method 800 continues at operation 806 with the HEW station 104 entering a sleep mode. For example, the HEW station 104 may enter a reduced power mode until a wake-up time which may be until the HEW station is to receive a resource allocation in the trigger frame or until the TXOP is over. The method 800 continues at operation 808 with continuing, and then the method 800 ends.

FIG. 9 illustrates a method of setting a NAV in response to a MU-RTS in accordance with some embodiments. Illustrates in FIG. 9 is time 904 along a horizontal axis and frequency 902 along a vertical axis. NAV settings 910 are indicated at the top along the horizontal axis. The NAVs 912 and 914 and may be the NAV of a HEW station 104. The NAV 914 may be set by an OBSS frame before the MU-RTS 916. The HEW station 104 may receive MU-RTS 916 from an AP 906, which may be a master station 102 that the HEW station 104 is associated with, and determine to set the NAV to 912 since the duration in the MU-RTS is longer than the duration of the NAV 914. The HEW station 104 may then receive trigger 918 from the AP 906 and reset the NAV based on the NAV 912 being set by the MU-RTS 916 transmitted by the same AP 906 (or master station 102) that transmits the trigger 918. The STA 908, which may be a HEW station 104 may then transmit data 920. In some embodiments, there is a technical problem of the HEW station 104 transmitting during the time of the NAV 914.

In some embodiments, the HEW station 104 has two NAVs so that the HEW station 104 does not transmit in the situation described in FIG. 9. The HEW station 104 may have an OBSS NAV and an intra BSS (IBSS) NAV. The MU-RTS and trigger frame will set IBSS NAV of the stations. When HEW stations 104 determine whether to respond to a trigger frame or MU-RTS, the HEW stations 104 will not consider the IBSS NAV, but only the OBSS NAV, in accordance with some embodiments.

If a HEW station 104 is set by IBSS NAV, then a STA will not contend. If a HEW station 104 can determine if a frame is IBSS frame, then STA can also set IBSS NAV based on the IBSS frame. A CF-End frame may be used to end IBSS NAV if the CF-end is from an IBSS master station 102. Similarly, CF-end frame can be used to end inter BSS NAV if the CF-End is from inter BSS. In some embodiments, the HEW station 104 records whether a NAV is set by IBSS master station 102 or an OBSS master station 102. The HEW station 104 may reset the NAV if a CF-end is from an OBSS master station 102 and the NAV was set by the same OBSS master station 102 (or a master station from the same OBSS). The HEW station 104 may reset the NAV if a CF-end is from an IBSS master station 102 and the NAV was set by an IBSS master station 102 (or a master station 102 from the same IBSS).

Figure 10:
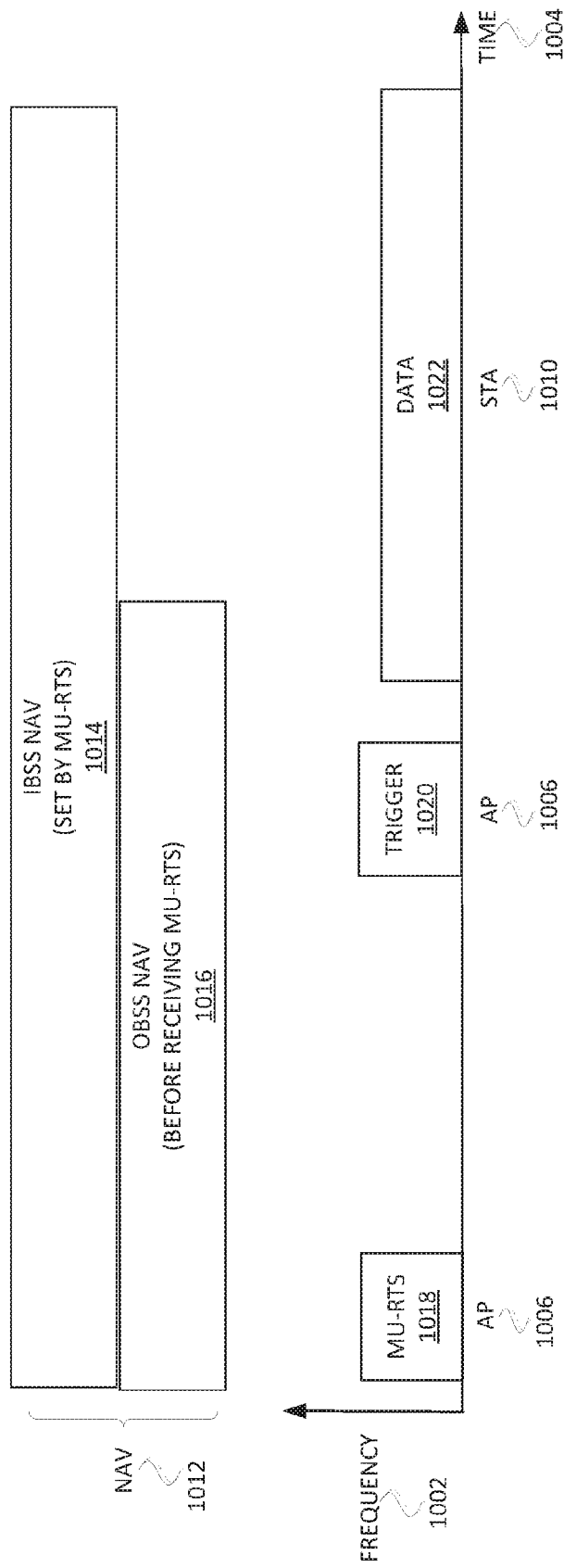
FIG. 10 illustrates a method of setting a NAV in response to a MU-RTS in accordance with some embodiments.

FIG. 10 illustrates a method of setting a NAV in response to a MU-RTS in accordance with some embodiments. Illustrates in FIG. 10 is time 1004 along a horizontal axis and frequency 1002 along a vertical axis. NAV settings 1012 are indicated at the top along the horizontal axis. The IBSS NAVs 1014 and OBSS NAV 1016 are NAVs of a HEW station 104. The OBSS NAV 1016 may be set by an OBSS frame before the MU-RTS 1006. The HEW station 104 may receive MU-RTS 1006 from an AP 1006, which may be a master station 102 that the HEW station 104 is associated with, and set the IBSS NAV to 1014. The HEW station 104 may then receive trigger 1020 from the AP 1006 (master station 102) and reset the IBSS NAV 1014 based on the NAV 1014 being set by the MU-RTS 1014 transmitted by the same master station 102 that transmits the trigger 1006. The HEW station 104 may then determine whether to transmit data 1010. In some embodiments, the HEW station 104 (STA 1010) will not transmit data 1022 because the OBSS NAV is still set. In some embodiments, the STA 1010 may be configured to respond to the trigger 1020 if the response is an ACK/BACK and/or a duration of the response is below a threshold.

FIG. 11 illustrates a portion of MU-RTS frame 1100 in accordance with some embodiments. The MU-RTS frame 110 includes STA information 1102, TXOP indication 1110, duration 1112, and resource allocation 1114. The duration 1112 is the duration of the TXOP opportunity. The STA information 1102 includes STA AID 1104, start of protected 20 MHz bands 1106, number of 20 MHz bands, and TXOP indication 1110. The STA AID 1104 is an indication of the association identification of the HEW station 104. In some embodiments, the STA AID 1104 may be indicated in a different way. For example, as a group and then group member. The start of protected 20 MHz bands 1106 and number of 20 MHz bands is an indication of one or more sub-channels for the HEW station 104 to use. In some embodiments, the sub-channels may be indicated in a different manner. The TXOP indication 1110 is an optional field that is an indication of whether the HEW station 104 identified by STA AID 1104 will be assigned a resource allocation in the trigger frame.

In some embodiments, the MU-RTS 1100 may also include a resource allocation 1114. The resource allocation 1114 may include one or more sub-channels and a duration for the HEW station 104 to use in a TXOP. The MU-RTS 1100 may include the resource allocation 1114 and may begin a TXOP so that a trigger frame is not necessary.

Figure 12:
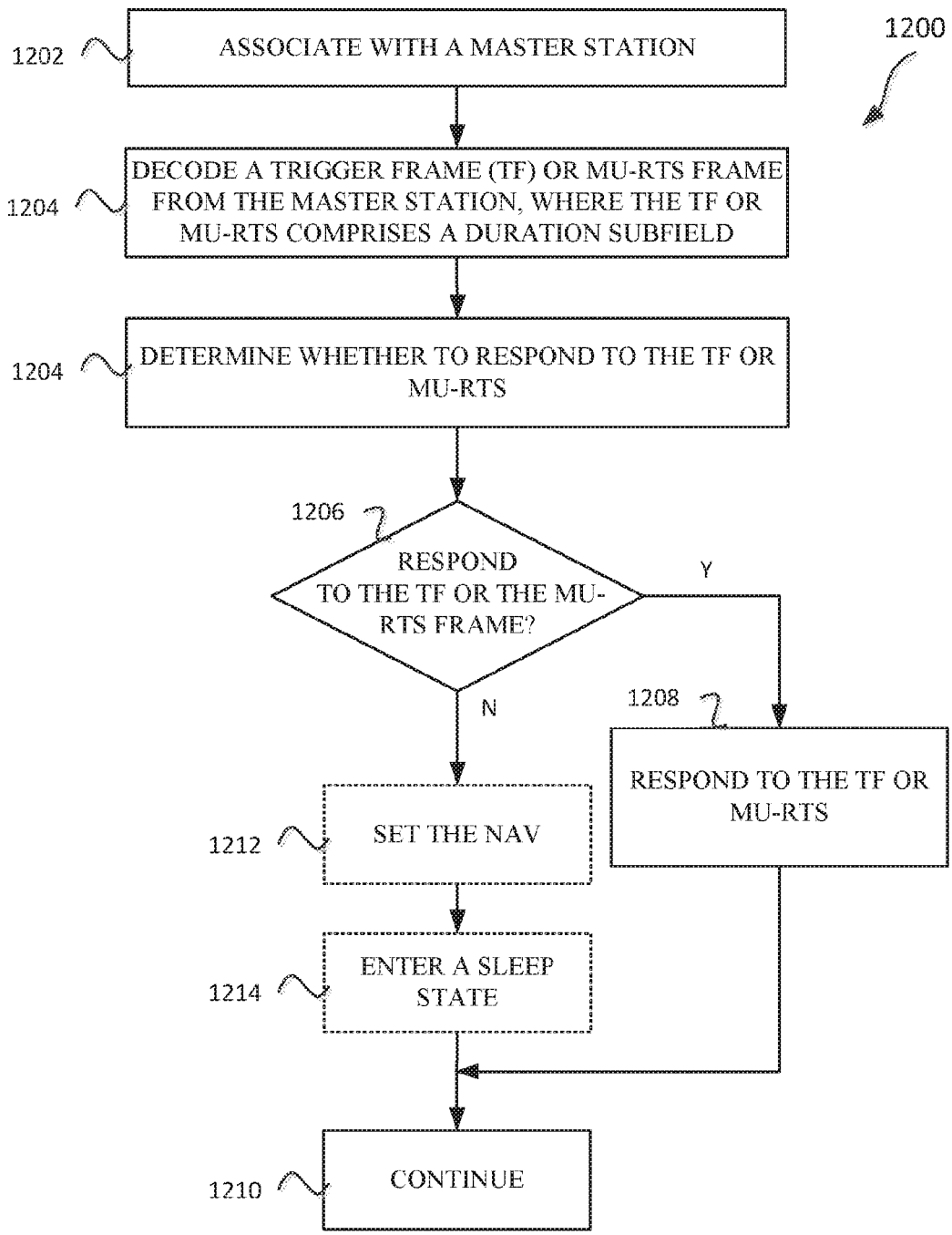
FIG. 12 illustrates a method for determining for responding to a trigger frame or MU-RTS in accordance with some embodiments.

FIG. 12 illustrates a method 1200 for determining for responding to a trigger frame or MU-RTS in accordance with some embodiments. The method 1200 may being at operation 1202 with associating with a master station. For example a HEW station 104 may associate with the master station 102. The master station 102 may generate an association identification (AID) for the HEW station 102. Once the master station 102 and HEW station 104 are associated the master station 102 and/or HEW station 104 may perform services for one another. For example, the master station 102 may buffer data from outside sources (e.g., the Internet) for the HEW station 104 and then transmit the data to the HEW station 104. As another example, the master station 102 may receive data from the HEW station 104 and forward the data to another device.

The method 1200 continues at operation 1204 with decode a trigger frame (TF) or MU-RTS frame from the master station, where the TF or MU-RTS comprises a duration subfield. For example, a HEW station 104 may receive and decode a TF or MU-RTS frame such as MU-RTS 1100 or a TF (not illustrates) that may or may not include a resource allocation for the HEW station 104 to participate in a TXOP.

The HEW station 104 may receive the trigger frame or MU-RTS in accordance with one from the following group: MU-MIMO, OFDMA, and downlink single user (DL SU).

The method 1200 continues at operation 1204 with determining whether to respond to the TF or MU-RTS. For example, a HEW station 104 may receive a MU-RTS or TF and determine whether or not to respond to the MU-RTS or TF.

In some embodiments, the HEW station may determine to respond to the trigger frame or the MU-RTS frame if a NAV is not set, or if the NAV is set and a saved TXOP holder address for the NAV is the same as the transmitter address of the MU-RTS or trigger frame and the trigger frame or MU-RTS indicates the station is to respond. In some embodiments a broadcast address as the receiver address in the MU-RTS does not indicate the address of the station.

In some embodiments, the HEW device 104 and/or master station 102 may be configured to store a TXOP address when it sets the NAV. For example, if a packet includes a duration and a transmitter address, then the HEW device 104 may set the TXOP address to the transmitter address and the NAV to the duration.

In some embodiments, the HEW device 104 may determine to respond to the trigger frame or the MU-RTS frame if the NAV is set and a response to the trigger frame is to be an ACK or BA and the duration of the response is below a threshold.

In some embodiments, the HEW device 103 may determine to respond to the trigger frame if a duration of an uplink transmission is less than a threshold and if the trigger frame indicates the station is to respond.

In some embodiments, the HEW device 103 may determine to respond to the trigger frame if an acknowledgement is to be transmitted to the master station in accordance with the trigger frame.

The method 1200 may continue at operation 1206 with respond to the TF or the MU-RTS frame. For example, the HEW station 104 will respond based on the determination made at operation 1204. The method 1200 continues at operation 1208 with responding to the TF or MU-RTS if it was determined to respond at operation 1204.

For example, the HEW station 104 may encode a data frame, ACK frame, or BA frame; and respond to the trigger frame or MU-RTS by causing the data frame, the ACK frame, or the BACK frame to be transmitted to the master station in accordance with at least one from the following group: MU-MIMO and OFDMA. The HEW station 104 may respond in accordance with a resource allocation indicated in the trigger frame or MU-RTS.

In some embodiments, the HEW station 104 may respond to the MU-RTS by encoding a multi-user clear-to-send (MU-CTS) with a duration field that indicates how long other wireless devices are to defer, where the duration field is determined based a duration indicated in the MU-RTS. The duration field indicates how long other wireless devices are to defer.

In some embodiments, the HEW station 104 may respond to the TR or MU-RTS by receiving packets in accordance with a resource allocation for a TXOP. In some embodiments, the HEW station 104 may receive a an uplink resource allocation in the TXOP and transmit uplink data to the master station 102.

In some embodiments, the HEW station 104 is configured to if the NAV is set to the duration indicated in the TR or MU-RTS, reset the NAV, if a clear-to-send (CTS) is not received from another wireless device within a first predetermined time after the MU-RTS is received and data is not received from the master station within a second predetermined time. In some embodiments, the method 1200 may optionally include setting the NAV after operation 1208.

If the station is not to respond to the TF or MU-RTS, then the method 1200 may continue from operation 1206 to, optionally, operation 1212 with setting the NAV.

For example, the HEW station 104 may set the NAV to the duration indicated in the TF or MU-RTS, if the duration is longer than a current duration of the NAV, and if the trigger frame or the MU-RTS frame indicates the station is not to respond to the trigger frame or the MU-RTS frame.

The method 1200 may continue with, optionally, entering a sleep state. For example, the HEW station 104 may be configured to enter a sleep state if the station is not to participate in a transmission opportunity indicated by the TF or MU-RTS frame. In some embodiments, the TF or MU-RTS comprises a time when the station will receive or transmit in a TXOP, and the HEW station 104 may be configured to enter a sleep state until the time when the wireless device is to receive or transmit in the TXOP. The method 1200 after operation 1208 and operation 1214 may continue at operation 1210 with continuing.

Figure 13:
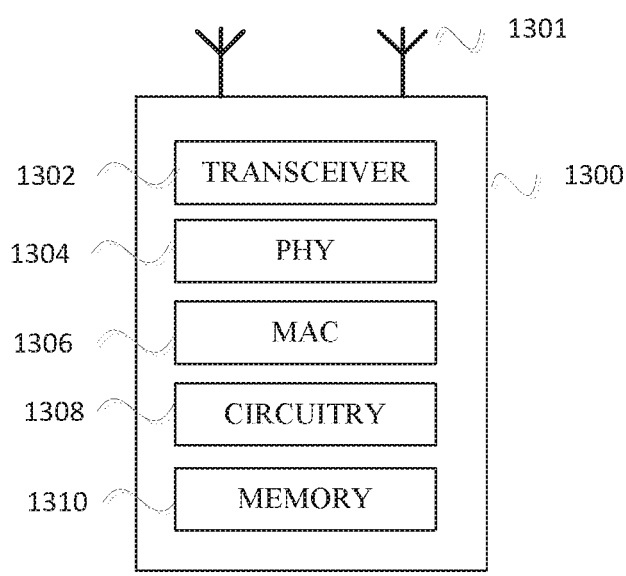
FIG. 13 illustrates a HEW device 1300 in accordance with some embodiments.

FIG. 13 illustrates a HEW device 1300 in accordance with some embodiments. HEW device 1300 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 1300 may be suitable for operating as master station 102 (FIG. 1) or a HEW STA 104 (FIG. 1). In accordance with embodiments, HEW device 1300 may include, among other things, a transmit/receive element 1301 (for example an antenna), a transceiver 1302, physical (PHY) circuitry 1304, and media access control (MAC) circuitry 1306. PHY circuitry 1304 and MAC circuitry 1306 may be HEW compliant layers and may also be compliant with one or more legacy IEEE 802.13 standards. MAC circuitry 1306 may be arranged to configure packets such as a physical layer convergence procedure (PLCP) protocol data unit (PPDUs) and arranged to transmit and receive PPDUs, among other things. HEW device 1300 may also include circuitry 1308 and memory 1310 configured to perform the various operations described herein. The circuitry 1308 may be coupled to the transceiver 1302, which may be coupled to the transmit/receive element 1301. While FIG. 13 depicts the circuitry 1308 and the transceiver 1302 as separate components, the circuitry 1308 and the transceiver 1302 may be integrated together in an electronic package or chip.

In some embodiments, the MAC circuitry 1306 may be arranged to contend for a wireless medium during a contention period to receive control of the medium for the HEW control period and configure an HEW PPDU. In some embodiments, the MAC circuitry 1306 may be arranged to contend for the wireless medium based on channel contention settings, a transmitting power level, and a CCA level.

The PHY circuitry 1304 may be arranged to transmit the HEW PPDU. The PHY circuitry 1304 may include circuitry for modulation/demodulation, upconversion/downconversion, filtering, amplification, etc. In some embodiments, the circuitry 1308 may include one or more processors. The circuitry 1308 may be configured to perform functions based on instructions being stored in a RAM or ROM, or based on special purpose circuitry. The circuitry 1308 may include processing circuitry and/or transceiver circuitry in accordance with some embodiments. The circuitry 1308 may include a processor such as a general purpose processor or special purpose processor. Although illustrated as separate elements, the PHY 1304 and MAC 906 may be part of the circuitry 1308. The circuitry 1308 may implement one or more functions associated with transmit/receive elements 1301, the transceiver 1302, the PHY circuitry 1304, the MAC circuitry 1306, and/or the memory 1310.

In some embodiments, the circuitry 1308 may be configured to perform one or more of the functions and/or methods described herein and/or in conjunction with FIGS. 1-13.

In some embodiments, the transmit/receive elements 1301 may be two or more antennas that may be coupled to the PHY circuitry 1304 and arranged for sending and receiving signals including transmission of the HEW packets. The transceiver 1302 may transmit and receive data such as HEW PPDU and packets that include an indication that the HEW device 1300 should adapt the channel contention settings according to settings included in the packet. The memory 1310 may store information for configuring the other circuitry to perform operations for configuring and transmitting HEW packets and performing the various operations to perform one or more of the functions and/or methods described herein and/or in conjunction with FIGS. 1-13.

In some embodiments, the HEW device 1300 may be configured to communicate using OFDM communication signals over a multicarrier communication channel. In some embodiments, HEW device 1300 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 1300 may use 4× symbol duration of 802.11n or 802.11 ac.

In some embodiments, an HEW device 1300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 1300 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a station. The apparatus comprising a memory and processing circuitry coupled to the memory. The processing circuitry configured to: associate with a master station; decode a trigger frame or a multi-user request-to-send (MU-RTS) frame from the master station, wherein the trigger frame or the MU-RTS frame comprises a first duration and a transmitter address; and respond to the trigger frame or the MU-RTS frame if a network allocation vector (NAV) is not set, or if the NAV is set and a saved transmission opportunity (TXOP) holder address for the NAV is the same as the transmitter address of the MU-RTS or trigger frame and the trigger frame or MU-RTS indicates the station is to respond.

In Example 2, the subject matter of Example 1 can optionally include where the processing circuitry is further configured to: respond to the trigger frame or the MU-RTS frame if the NAV is set and a response to the trigger frame is to be an acknowledge (ACK) or block ACK (BA) and the duration of the response is below a threshold.

In Example 3, the subject matter of Examples 1 or 2 can optionally include where the processing circuitry is further configured to: encode a data frame, acknowledge (ACK) frame, or block ACK (BACK) frame; and respond to the trigger frame by causing the data frame, the ACK frame, or the BACK frame to be transmitted to the master station in accordance with at least one from the following group: multi-user multiple-input multiple-output (MU-MIMO) and orthogonal frequency division multiple-access (OFDMA).

In Example 4, the subject matter of any of Examples 1-3 can optionally include where the processing circuitry is further configured to: set the NAV to the first duration if the first duration is longer than a current duration of the NAV, and if the trigger frame or the MU-RTS frame indicates the station is not to respond to the trigger frame or the MU-RTS frame.

In Example 5, the subject matter of any of Examples 1-4 can optionally include where the processing circuitry is configured to: in response to the MU-RTS, encode a multi-user clear-to-send (MU-CTS) with a duration field that indicates how long other wireless devices are to defer, wherein the duration field is determined based on the first duration.

In Example 6, the subject matter of any of Examples 1-5 can optionally include where the processing circuitry is configured to: determine if the MU-RTS indicates the station is to transmit a multi-user clear-to-send (MU-CTS), and if the wireless device is to transmit a MU-CTS, encode the MU-CTS with a duration field that indicates how long other wireless devices are to defer, wherein the duration field is determined based on the first duration.

In Example 7, the subject matter of any of Examples 1-6 can optionally include where the processing circuitry is further configured to: respond to the MU-RTS with a multi-user clear-to-send (MU-CTS); and encode the MU-CTS with a duration field that indicates how long other wireless devices are to defer, wherein the duration field is determined based on the first duration.

In Example 8, the subject matter of Example 7 can optionally include where the processing circuitry is further configured to: if the NAV is set to the first duration, reset the NAV, if a clear-to-send (CTS) is not received from another wireless device within a first predetermined time after the MU-RTS is received and data is not received from the master station within a second predetermined time.

In Example 9, the subject matter of Example 8 can optionally include where the MU-RTS further comprises an indication that the station is to transmit or receive in a transmission opportunity (TXOP).

In Example 10, the subject matter of any of Examples 1-9 can optionally include where the processing circuitry is further configured to: respond to the trigger frame if a duration of an uplink transmission is less than a threshold and if the trigger frame indicates the station is to respond.

In Example 11, the subject matter of any of Examples 1-10 can optionally include where the processing circuitry is further configured to: respond to the trigger frame if an acknowledgement is to be transmitted to the master station in accordance with the trigger frame.

In Example 12, the subject matter of any of Examples 1-11 can optionally include where a broadcast address as the receiver address in the MU-RTS does not indicate the address of the station.

In Example 13, the subject matter of any of Examples 1-12 can optionally include where the processing circuitry is further configured to: enter a sleep state if the station is not to participate in a transmission opportunity indicated by the trigger frame or MU-RTS frame.

In Example 14, the subject matter of any of Examples 1-13 can optionally include where the trigger frame comprises a time when the station will receive or transmit in a transmission opportunity (TXOP) indicated by the trigger frame or MU-RTS frame, and wherein the processing circuitry is further configured to: enter a sleep state until the time when the wireless device is to receive or transmit in the TXOP.

In Example 15, the subject matter of any of Examples 1-14 can optionally include where the station is one from the following group: a station, an access point, an Institute of Electrical and Electronic Engineers (IEEE) 802.11ax access point, an IEEE 802.11ax station, and an IEEE station, and an IEEE access point.

In Example 16, the subject matter of any of Examples 1-15 can optionally include one or more antennas coupled to the processing circuitry.

In Example 17, the subject matter of any of Examples 1-16 can optionally include where the processing circuitry is further configured to: receive the trigger frame or MU-RTS in accordance with one from the following group: multi-user multiple-input multiple-output (MU-MIMO), orthogonal frequency division multiple access (OFDMA), and downlink single user (DL SU).

In Example 18, the subject matter of Example 17 can optionally include where the processing circuitry is further configured to: receive a packet in a transmission opportunity indicated by the trigger frame or MU-RTS in accordance with one or more from the following group: downlink (DL) multi-user multiple-input multiple-output (MU-MIMO), DL orthogonal frequency division multiple access (OFDMA), and DL single user (SU).

In Example 19, the subject matter of Example 18 can optionally include where the processing circuitry is further configured to: receive an uplink resource allocation in a transmission opportunity from the master station; and transmit a packet in accordance with the resource allocation to the master station.

Example 20 is a non-transitory computer-readable storage medium that stores instructions for execution by one or more processors, the instructions to configure the one or more processors to cause a station to: associate with a master station; decode a trigger frame or a multi-user request-to-send (MU-RTS) frame from the master station, wherein the trigger frame or the MU-RTS frame comprises a first duration and a transmitter address; respond to the trigger frame or the MU-RTS frame if a network allocation vector (NAV) is not set, or if the NAV is set and a saved transmitter (TXOP) address for the NAV is the same as the transmitter address of the MU-RTS or trigger frame and the trigger frame or MU-RTS indicates the station is to respond; and respond to the trigger frame or the MU-RTS frame if the NAV is set and a response to the trigger frame is to be an acknowledge (ACK) or block ACK (BA) and the duration of the response is below a threshold.

In Example 21, the subject matter of Example 20 can optionally include where the instructions are further to configure the one or more processor to cause the wireless device to: encode a data frame, acknowledge (ACK) frame, or block ACK (BACK) frame, and respond to the trigger frame by causing the data frame, the ACK frame, or the BACK frame to be transmitted to the master station in accordance with at least one from the following group: multi-user multiple-input multiple-output (MU-MIMO) and orthogonal frequency division multiple-access (OFDMA).

In Example 22, the subject matter of Examples 20 or 21 can optionally include where the instructions are further to configure the one or more processor to cause the wireless device to: set the NAV to the first duration if the first duration is longer than a current duration of the NAV, and if the trigger frame or the MU-RTS frame indicates the station is not to respond to the trigger frame or the MU-RTS frame.

In Example 23, the subject matter of any of Examples 20-22 can optionally include where the instructions are further to configure the one or more processor to cause the wireless device to: determine if the MU-RTS indicates the station is to transmit a multi-user clear-to-send (MU-CTS), and if the wireless device is to transmit a MU-CTS, encode the MU-CTS with a duration field that indicates how long other wireless devices are to defer, wherein the duration field is determined based on the first duration.

Example 24 is a method performed by a station, the method comprising: associating with a master station; decoding a trigger frame or a multi-user request-to-send (MU-RTS) frame from the master station, wherein the trigger frame or the MU-RTS frame comprises a first duration and a transmitter address; responding to the trigger frame or the MU-RTS frame if a network allocation vector (NAV) is not set, or if the NAV is set and a saved transmitter (TXOP) address for the NAV is the same as the transmitter address of the MU-RTS or trigger frame and the trigger frame or MU-RTS indicates the station is to respond; and responding to the trigger frame or the MU-RTS frame if the NAV is set and a response to the trigger frame is to be an acknowledge (ACK) or block ACK (BA) and the duration of the response is below a threshold.

In Example 25, the subject matter of Example 24 can optionally include setting the NAV to the first duration if the first duration is longer than a current duration of the NAV, and if the trigger frame or the MU-RTS frame indicates the station is not to respond to the trigger frame or the MU-RTS frame.

Example 26 is an apparatus of a station, the apparatus comprising: means for associating with a master station; means for decoding a trigger frame or a multi-user request-to-send (MU-RTS) frame from the master station, wherein the trigger frame or the MU-RTS frame comprises a first duration and a transmitter address; and means for responding to the trigger frame or the MU-RTS frame if a network allocation vector (NAV) is not set, or if the NAV is set and a saved transmission opportunity (TXOP) holder address for the NAV is the same as the transmitter address of the MU-RTS or trigger frame and the trigger frame or MU-RTS indicates the station is to respond.

In Example 27, the subject matter of Example 27 can optionally include means for responding to the trigger frame or the MU-RTS frame if the NAV is set and a response to the trigger frame is to be an acknowledge (ACK) or block ACK (BA) and the duration of the response is below a threshold.

In Example 28, the subject matter of Examples 26 or 27 can optionally include means for encoding a data frame, acknowledge (ACK) frame, or block ACK (BACK) frame; and means for responding to the trigger frame by causing the data frame, the ACK frame, or the BACK frame to be transmitted to the master station in accordance with at least one from the following group: multi-user multiple-input multiple-output (MU-MIMO) and orthogonal frequency division multiple-access (OFDMA).

In Example 29, the subject matter of any of Examples 26-28 can optionally include means for setting the NAV to the first duration if the first duration is longer than a current duration of the NAV, and if the trigger frame or the MU-RTS frame indicates the station is not to respond to the trigger frame or the MU-RTS frame.

In Example 30, the subject matter of any of Examples 26-29 can optionally include in response to the MU-RTS, means for encoding a multi-user clear-to-send (MU-CTS) with a duration field that indicates how long other wireless devices are to defer, wherein the duration field is determined based on the first duration.

In Example 31, the subject matter of any of Examples 26-30 can optionally include means for determining if the MU-RTS indicates the station is to transmit a multi-user clear-to-send (MU-CTS), and if the wireless device is to transmit a MU-CTS, means for encoding the MU-CTS with a duration field that indicates how long other wireless devices are to defer, wherein the duration field is determined based on the first duration.

In Example 32, the subject matter of any of Examples 26-31 can optionally include means for responding to the MU-RTS with a multi-user clear-to-send (MU-CTS); and means for encoding the MU-CTS with a duration field that indicates how long other wireless devices are to defer, wherein the duration field is determined based on the first duration.

In Example 33, the subject matter of Example 32 can optionally include if the NAV is set to the first duration, means for resetting the NAV, if a clear-to-send (CTS) is not received from another wireless device within a first predetermined time after the MU-RTS is received and data is not received from the master station within a second predetermined time.

In Example 34, the subject matter of any of Examples 26-33 can optionally include where the MU-RTS further comprises an indication that the station is to transmit or receive in a transmission opportunity (TXOP).

In Example 35, the subject matter of any of Examples 26-34 can optionally include means for responding to the trigger frame if a duration of an uplink transmission is less than a threshold and if the trigger frame indicates the station is to respond.

In Example 36, the subject matter of any of Examples 26-35 can optionally include means for responding to the trigger frame if an acknowledgement is to be transmitted to the master station in accordance with the trigger frame.

In Example 37, the subject matter of any of Examples 26-36 can optionally include where a broadcast address as the receiver address in the MU-RTS does not indicate the address of the station.

In Example 38, the subject matter of any of Examples 26-37 can optionally include means for entering a sleep state if the station is not to participate in a transmission opportunity indicated by the trigger frame or MU-RTS frame.

In Example 39, the subject matter of any of Examples 26-38 can optionally include where the trigger frame comprises a time when the station will receive or transmit in a transmission opportunity (TXOP) indicated by the trigger frame or MU-RTS frame, and further comprising: means for entering a sleep state until the time when the wireless device is to receive or transmit in the TXOP.

In Example 40, the subject matter of any of Examples 26-39 can optionally include where the wireless device is one from the following group: a station, an access point, an Institute of Electrical and Electronic Engineers (IEEE)

802.11ax access point, an IEEE 802.11ax station, and an IEEE station, and an IEEE access point.

In Example 41, the subject matter of any of Examples 26-40 can optionally include means for transmitting and receiving electromagnetic radiation.

In Example 42, the subject matter of any of Examples 26-41 can optionally include means for receiving the trigger frame or MU-RTS in accordance with one from the following group: multi-user multiple-input multiple-output (MU-MIMO), orthogonal frequency division multiple access (OFDMA), and downlink single user (DL SU).

In Example 43, the subject matter of Example 42 can optionally include means for receiving a packet in a transmission opportunity indicated by the trigger frame or MU-RTS in accordance with one or more from the following group: downlink (DL) multi-user multiple-input multiple-output (MU-MIMO), DL orthogonal frequency division multiple access (OFDMA), and DL single user (SU).

In Example 44, the subject matter of Example 43 can optionally include means for receiving an uplink resource allocation in a transmission opportunity from the master station; and means for transmitting a packet in accordance with the resource allocation to the master station.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station, the apparatus comprising: a memory and processing circuitry coupled to the memory, the processing circuitry configured to:
    associate with a master station;
    decode a trigger frame or a multi-user request-to-send (MU-RTS) frame from the master station, wherein the trigger frame or the MU-RTS frame comprises a first duration and a transmitter address;
    if a network allocation vector (NAV) is not set, or if the NAV is set and a saved transmission opportunity (TXOP) holder address for the NAV is the same as the transmitter address of the MU-RTS or trigger frame,
    in response to the MU-RTS, if the MU-RTS indicates the station is to respond, encode a MU-CTS with a duration field that indicates how long other wireless devices are to defer, wherein the duration field is determined based on the first duration, and configure the station to transmit the MU-CTS,
    in response to the trigger frame, if the trigger frame indicates the station is to respond, encode a data frame, acknowledge (ACK) frame, or block ACK (BACK) frame, and configure the station to transmit the data frame, the ACK frame, or the BACK frame; and
    if the NAV is set to the first duration, reset the NAV, if a clear-to-send (CTS) is not received from another wireless device within a first predetermined time after the MU-RTS is received and data is not received from the master station within a second predetermined time, wherein the memory is configured to store the trigger frame or MU-RTS.

2. The apparatus of claim 1, wherein the processing circuitry is further configured to:
    respond to the trigger frame or the MU-RTS frame if the NAV is set and a response to the trigger frame is to be an acknowledge (ACK) or block ACK (BA) and the duration of the response is below a threshold.

3. The apparatus of claim 1, wherein the processing circuitry is further configured to:
    configure the station to transmit the data frame, acknowledge (ACK) frame, or block ACK (BACK) frame in accordance with at least one from the following group: multi-user multiple-input multiple-output (MU-MIMO) and orthogonal frequency division multiple-access (OFDMA).

4. The apparatus of claim 1, wherein the processing circuitry is further configured to:
    set the NAV to the first duration if the first duration is longer than a current duration of the NAV, and if the trigger frame or the MU-RTS frame indicates the station is not to respond to the trigger frame or the MU-RTS frame.

5. The apparatus of claim 1, wherein the processing circuitry is configured to:
    in response to the MU-RTS, encode a multi-user clear-to-send (MU-CTS) with a duration field that indicates how long other wireless devices are to defer, wherein the duration field is determined based on the first duration.

6. The apparatus of claim 1, wherein the processing circuitry is configured to:
    determine if the MU-RTS indicates the station is to transmit the MU-RTS.

7. The apparatus of claim 1, wherein the MU-RTS further comprises an indication that the station is to transmit or receive in a transmission opportunity (TXOP).

8. The apparatus of claim 1, wherein the processing circuitry is further configured to:
    respond to the trigger frame if a duration of an uplink transmission is less than a threshold and if the trigger frame indicates the station is to respond.

9. The apparatus of claim 1, wherein the processing circuitry is further configured to:
    respond to the trigger frame if an acknowledgement is to be transmitted to the master station in accordance with the trigger frame.

10. The apparatus of claim 1, wherein the processing circuitry is further configured to:
    determine a broadcast address value as a value of the receiver address in the MU-RTS does not indicate the station should responds to the MU-RTS.

11. The wireless apparatus of claim 1, wherein the processing circuitry is further configured to:
    enter a sleep state if the station is not to participate in a transmission opportunity indicated by the trigger frame or MU-RTS frame.

12. The apparatus of claim 1, wherein the trigger frame comprises a time when the station will receive or transmit in a transmission opportunity (TXOP) indicated by the trigger frame or MU-RTS frame, and wherein the processing circuitry is further configured to:
    enter a sleep state until the time when the wireless device is to receive or transmit in the TXOP.

13. The apparatus of claim 1, wherein the station is one from the following group: a station, an access point, an Institute of Electrical and Electronic Engineers (IEEE) 802.11ax access point, an IEEE 802.11ax station, and an IEEE station, and an IEEE access point.

14. The apparatus of claim 1, further comprising one or more antennas coupled to the processing circuitry.

15. The apparatus of claim 1, wherein the processing circuitry is further configured to:

receive the trigger frame or MU-RTS in accordance with one from the following group: multi-user multiple-input multiple-output (MU-MIMO), orthogonal frequency division multiple access (OFDMA), and downlink single user (DL SU).

16. The apparatus of claim 15, wherein the processing circuitry is further configured to:
receive a packet in a transmission opportunity indicated by the trigger frame or MU-RTS in accordance with one or more from the following group: downlink (DL) multi-user multiple-input multiple-output (MU-MIMO), DL orthogonal frequency division multiple access (OFDMA), and DL single user (SU).

17. The apparatus of claim 16, wherein the processing circuitry is further configured to:
receive an uplink resource allocation in a transmission opportunity from the master station; and
transmit a packet in accordance with the resource allocation to the master station.

18. A non-transitory computer-readable storage medium that stores instructions for execution by one or more processors of a station, the instructions to configure the one or more processors to:
associate with a master station;
decode a trigger frame or a multi-user request-to-send (MU-RTS) frame from the master station, wherein the trigger frame or the MU-RTS frame comprises a first duration and a transmitter address;
if a network allocation vector (NAV) is not set, or if the NAV is set and a saved transmission opportunity (TXOP) holder address for the NAV is the same as the transmitter address of the MU-RTS or trigger frame,
in response to the MU-RTS, if the MU-RTS indicates the station is to respond, encode a MU-CTS with a duration field that indicates how long other wireless devices are to defer, wherein the duration field is determined based on the first duration, and configure the station to transmit the MU-CTS,
in response to the trigger frame, if the trigger frame indicates the station is to respond, encode a data frame, acknowledge (ACK) frame, or block ACK (BACK) frame, and configure the station to transmit the data frame, the ACK frame, or the BACK frame; and
if the NAV is set to the first duration, reset the NAV, if a clear-to-send (CTS) is not received from another wireless device within a first predetermined time after the MU-RTS is received and data is not received from the master station within a second predetermined time, wherein the memory is configured to store the trigger frame or MU-RTS.

19. The non-transitory computer-readable storage medium of claim 18, wherein the instructions are further to configure the one or more processor to:
configure the station to transmit the data frame, acknowledge (ACK) frame, or block ACK (BACK) frame;
in accordance with at least one from the following group: multi-user multiple-input multiple-output (MU-MIMO) and orthogonal frequency division multiple-access (OFDMA).

20. The non-transitory computer-readable storage medium of claim 18, wherein the instructions are further to configure the one or more processors to:
set the NAV to the first duration if the first duration is longer than a current duration of the NAV, and if the trigger frame or the MU-RTS frame indicates the station is not to respond to the trigger frame or the MU-RTS frame.

21. The non-transitory computer-readable storage medium of claim 18, wherein the instructions are further to configure the one or more processors to:
determine if the MU-RTS indicates the station is to transmit the MU-RTS.

22. A method performed by a station, the method comprising:
associating with a master station;
decoding a trigger frame or a multi-user request-to-send (MU-RTS) frame from the master station, wherein the trigger frame or the MU-RTS frame comprises a first duration and a transmitter address;
if a network allocation vector (NAV) is not set, or if the NAV is set and a saved transmission opportunity (TXOP) holder address for the NAV is the same as the transmitter address of the MU-RTS or trigger frame,
in response to the MU-RTS, if the MU-RTS indicates the station is to respond, encoding a MU-CTS with a duration field that indicates how long other wireless devices are to defer, wherein the duration field is determined based on the first duration, and configuring the station to transmit the MU-CTS,
in response to the trigger frame, if the trigger frame indicates the station is to respond, encoding a data frame, acknowledge (ACK) frame, or block ACK (BACK) frame, and configuring the station to transmit the data frame, the ACK frame, or the BACK frame; and
if the NAV is set to the first duration, resetting the NAV, if a clear-to-send (CTS) is not received from another wireless device within a first predetermined time after the MU-RTS is received and data is not received from the master station within a second predetermined time wherein the memory is configured to store the trigger frame or MU-RTS.

23. The method of claim 22, further comprising:
setting the NAV to the first duration if the first duration is longer than a current duration of the NAV, and if the trigger frame or the MU-RTS frame indicates the station is not to respond to the trigger frame or the MU-RTS frame.

* * * * *